United States Patent [19]
Yamazaki et al.

[11] Patent Number: 5,885,120
[45] Date of Patent: Mar. 23, 1999

[54] WATERCRAFT ENGINE CONTROL

[75] Inventors: Susumu Yamazaki; Kazumasa Itoh, both of Iwata, Japan

[73] Assignee: Yamaha Hatsudoki Kabushiki Kaisha, Iwata, Japan

[21] Appl. No.: 828,600

[22] Filed: Mar. 31, 1997

[30] Foreign Application Priority Data

Apr. 2, 1996 [JP] Japan ................................. 8-080262

[51] Int. Cl.⁶ .................................................. B60K 41/00
[52] U.S. Cl. ............................................. 440/84; 440/87
[58] Field of Search ..................... 440/88, 89, 1, 440/84, 87; 123/323, 533, 73 A

[56] References Cited

U.S. PATENT DOCUMENTS

| | | |
|---|---|---|
| 4,671,220 | 6/1987 | Inoue et al. . |
| 4,909,193 | 3/1990 | Boyesen ................. 123/323 |
| 4,957,664 | 9/1990 | Kohno et al. . |
| 4,986,780 | 1/1991 | Sougawa . |
| 5,018,503 | 5/1991 | Hoshiba et al. . |
| 5,094,217 | 3/1992 | Kaku et al. ............... 123/533 |
| 5,190,006 | 3/1993 | Motoyama et al. . |
| 5,240,649 | 8/1993 | Yamada et al. . |
| 5,322,044 | 6/1994 | Maebashi . |
| 5,400,755 | 3/1995 | Maebashi . |
| 5,575,246 | 11/1996 | Ito . |

*Primary Examiner*—Stephen Avila
*Attorney, Agent, or Firm*—Knobbe, Martens, Olson & Bear LLP

[57] ABSTRACT

An engine control is provided for controlling an engine powering a planing-type watercraft. The engine control activates a fuel increasing system for providing an additional amount of fuel to said engine over a first amount of fuel during a period of acceleration of said watercraft to its planing speed. In addition, the engine control preferably adjusts the position of an exhaust timing valve to delay the passage of exhaust from the combustion chamber(s) of the engine during that time the additional fuel amount is being provided to the engine in order to prevent overheating and fouling of an exhaust catalyst.

21 Claims, 5 Drawing Sheets

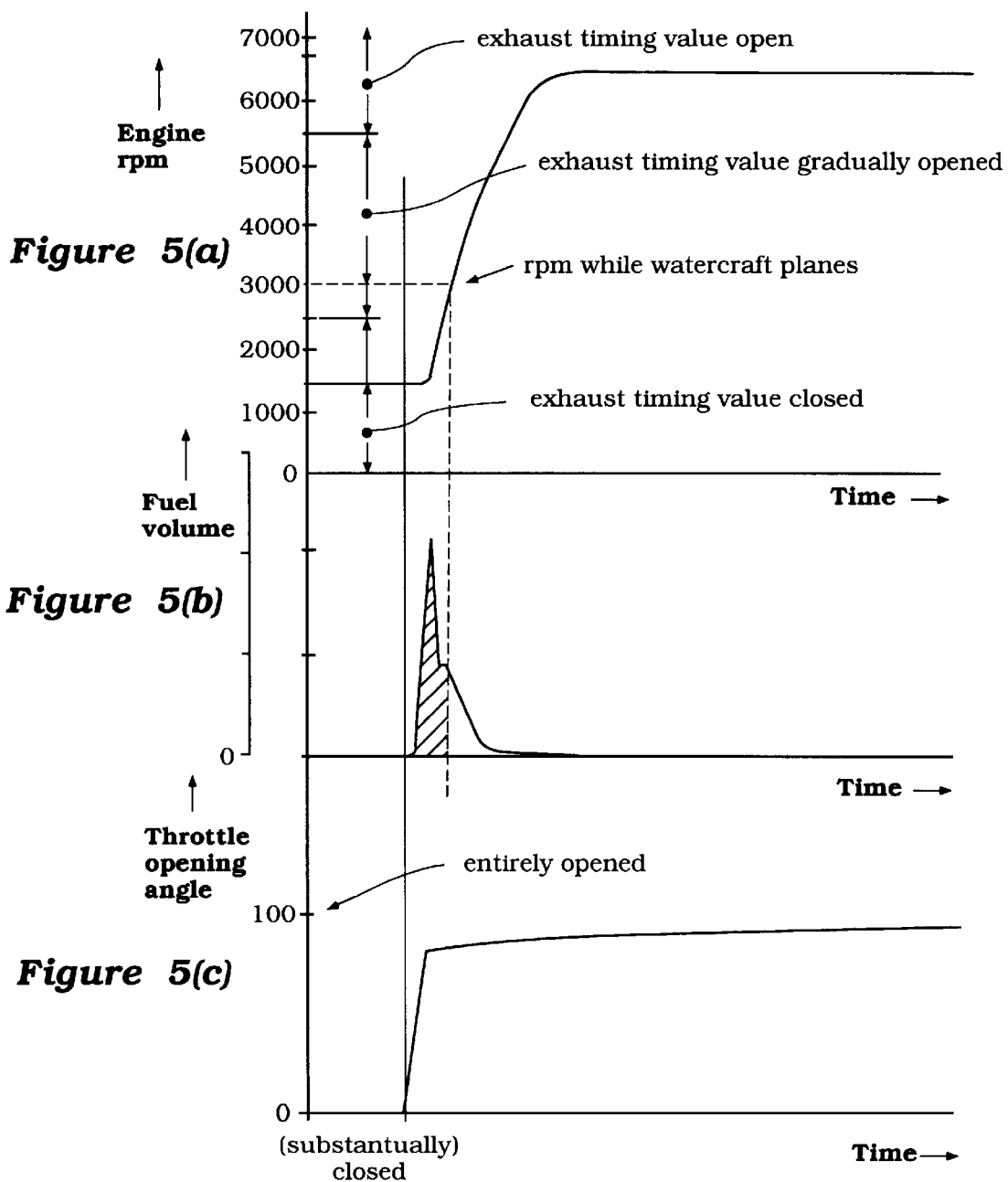

WATERCRAFT ENGINE CONTROL

FIELD OF THE INVENTION

The present invention relates to an engine control for controlling an engine powering a watercraft, and more particularly, to such a control for increasing the amount of fuel delivered to the engine during acceleration of the watercraft to its planing velocity and for controlling the exhaust output of the engine to prevent catalyst fouling and overheating.

BACKGROUND OF THE INVENTION

It has been found desirable in many instances to provide engines with a leaner than stoichiometric air/fuel mixture. Maintaining a lean air/fuel mixture has the advantage that unburned fuel is not exhausted, reducing the possibility of catalyst fouling and reducing the amount of harmful emissions. While providing an engine with a lean air/fuel mixture is satisfactory in many running conditions, such as when the engine is idling, such does not often provide sufficient fuel to support engine acceleration at other times.

This problem is especially acute in watercraft. As is well known, in order to move a watercraft from a trolling velocity to a planing velocity, a great increase in watercraft velocity must be effectuated. This requires a large increase in power output during a period of engine acceleration. If the engine is supplied with too lean of an air and fuel mixture, the engine will not provide the power output necessary to effectuate planing of the watercraft.

On the other hand, if the amount of the fuel delivered to the engine is increased, if even during only short periods of acceleration, the engine may exhaust unburned fuel components. In modern engines having exhaust systems with exhaust gas catalysts, the exhausting of unburned fuel may result in the fouling or overheating of the catalyst.

A system for providing the required air/fuel mixture to an engine powering a watercraft during all phases of engine operation, and wherein catalyst fouling and overheating is prevented, is desired.

SUMMARY OF THE INVENTION

In accordance with the present invention, there is provided a method and device for providing fuel to an internal combustion engine and for controlling the engine in a manner which prevents the exhausting of exhaust components which would foul an exhaust catalyst associated with the engine.

Preferably, the engine is of the two-cycle variety and is utilized to power a watercraft. In accordance with the present invention, the engine control comprises a means for providing a leaner than stoichiometric air and fuel mixture during periods of engine idling, and a means for increasing the fuel delivery rate during periods when the engine requires additional fuel to provide a higher power output, such as when it is desired to power the watercraft from an idling to a planing state. In addition, the engine control includes a means for preventing the exhausting of unburned fuel and other components which would foul a catalyst for catalyzing the engine's exhaust or cause overheating of the catalyst.

Preferably, the means for providing the air and fuel mixture comprises a carburetor. A return line is provided for returning fuel supplied to the carburetor but not delivered to the air passing therethrough. A second fuel line is provided between the return line and an intake passage leading from the carburetor through a reed-type valve to a crankcase chamber corresponding to the combustion chamber. A valve is provided which is movable between a first and second position. In the first position, the valve closes the return line and routes the returned fuel to the second line and to the incoming air, and in the second position, the valve closes the second line and opens the return line, whereby no additional fuel is delivered. Means are provided for moving the valve to its first position during acceleration of the watercraft to its planing velocity.

In addition, the engine control controls the position of an exhaust timing valve for controlling the exhaust content and preventing overheating and fouling of the catalyst. Preferably, the exhaust timing valve is positioned to delay the passage of exhaust from the combustion chamber of the engine during that time the secondary or additional amount of fuel is delivered to the engine during watercraft acceleration.

Preferably, the engine control causes the secondary or additional amount of fuel to begin being delivered to the engine immediately upon sensing of the desired acceleration of the watercraft to planing speed, and even before any throttle control is moved to its substantially open position.

Further objects, features, and advantages of the present invention over the prior art will become apparent from the detailed description of the drawings which follows, when considered with the attached figures.

BRIEF DESCRIPTION OF THE DRAWINGS

FIG. 5a is a diagram illustrating the position of an exhaust timing valve positioned within an exhaust passage as compared to engine rpm, and illustrating the speed of a watercraft powered by the engine, over time;

FIG. 5b is a diagram illustrating the fuel volume supplied to the engine over time, as it relates to the engine rpm in the diagram of FIG. 5a; and FIG. 5c is a diagram illustrating the throttle opening angle over time as it relates to the engine rpm in the diagram of FIG. 5a.

DETAILED DESCRIPTION OF THE PREFERRED EMBODIMENTS OF THE INVENTION

Figure 1:
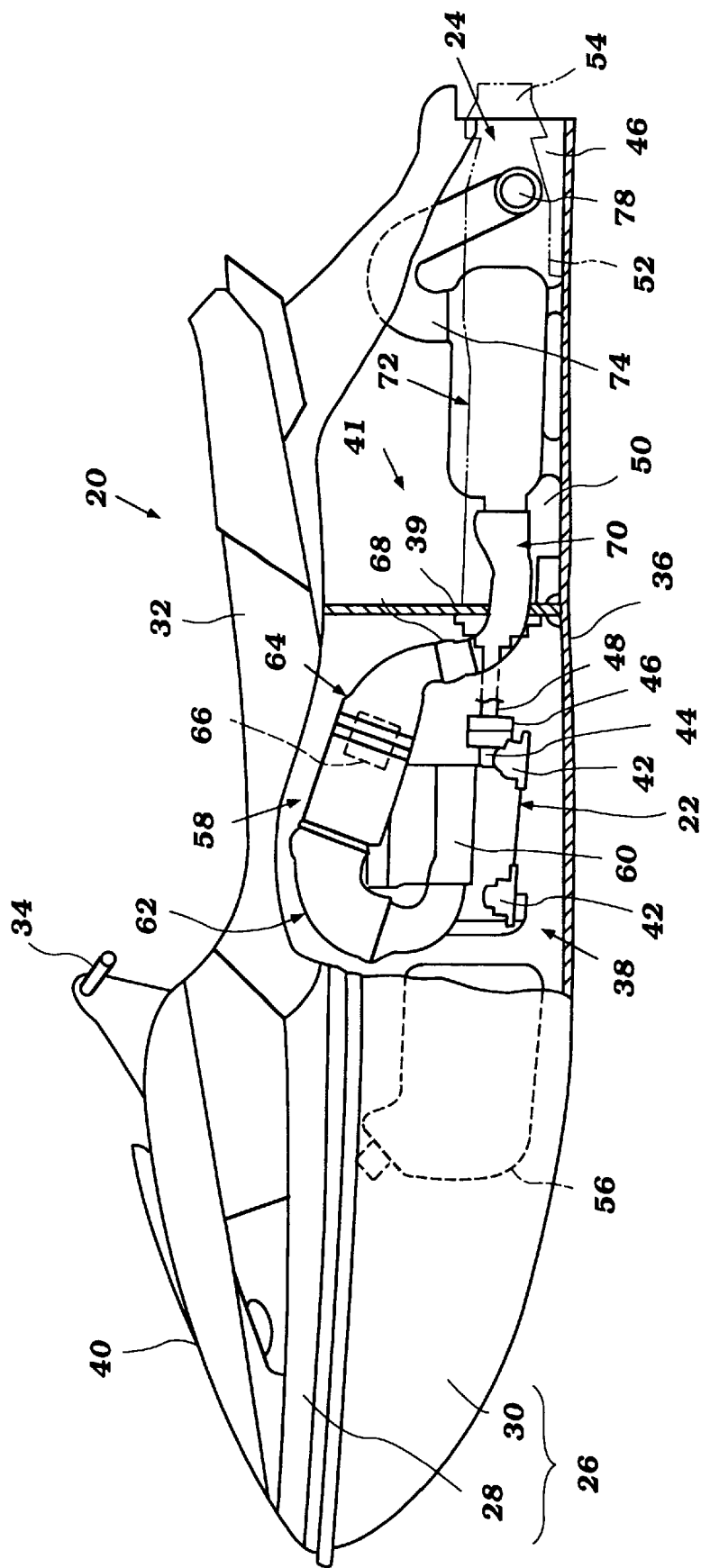
FIG. 1 is a side view, in partial cross-section, of a watercraft powered by an engine controlled by an engine control in accordance with the present invention.

FIG. 1 illustrates a personal watercraft 20 powered by an engine 22 having an engine control in accordance with the present invention. As illustrated therein, the watercraft 20 is of the jet propulsion type wherein the watercraft sucks in water through an intake and ejects it rearward. The watercraft 20 includes a propulsion unit 24 for propelling the water, the propulsion unit powered by the engine 22.

In general, the watercraft 20 includes a hull 26 having a top portion 28 and a lower portion 30. A seat 32 is positioned on the top portion 28 of the hull 26. A steering handle 34 is provided adjacent the seat 32 for use by a user in directing the watercraft 20. The lower portion 30 of the hull 26 has a bottom portion 36.

The top and bottom portions 28,30 of the hull 26, along with a bulkhead 39, define a front interior space 38 and a rear interior space 41 The engine 22 is positioned in the front interior space 38, which is accessible through a hull hatch 40. The engine 22 is connected to the hull 26 via several engine mounts 42. The engine 22 has a crankshaft 44 coupled via a coupling 46 to a drive shaft 48. The drive shaft 48 rotationally drives the propulsion unit 24 which extends out a rear end of the lower portion 30 of the hull 28. The lower portion 30 of the hull 28 includes an intake port 50 which is in communication, via a passage 52 in which an impeller (not shown) driven by the drive shaft 48 is positioned, with a nozzle 54. The nozzle 54 is mounted for movement up and down and to the left and right, whereby the direction of the propulsion force for the watercraft 20 may be varied.

Fuel is supplied to the engine 22 from a fuel tank 56 positioned within the hull 26 of the watercraft 20 forward of the engine 22. Fuel is supplied from the fuel tank 56 to the engine 22 through an appropriate fuel line (not shown).

A combustion air supply is also provided to the engine 22 for use in the fuel combustion process. This air is drawn by the engine 22 through the front interior space 38 of the hull 26 from one or more air ducts (not shown) in the hull 28.

Exhaust gas generated by the engine 22 is routed from the engine to a point external to the watercraft 20 by an exhaust system 58 which includes an exhaust manifold 60 The exhaust manifold 60 extends to a "C"-shaped connector pipe 62 which is in turn connected to an expansion pipe 64. A catalyst 66 is positioned within the expansion pipe 64. The expansion pipe 64 is connected to a front exhaust pipe 70 via a flexible conduit 68. The front exhaust pipe 70 leads to a water lock 72, which is in turn connected to a rear exhaust pipe 74 which has its opening 78 in communication with the water through the pump chamber 76 in which the jet passage 52 is positioned.

Figure 4:
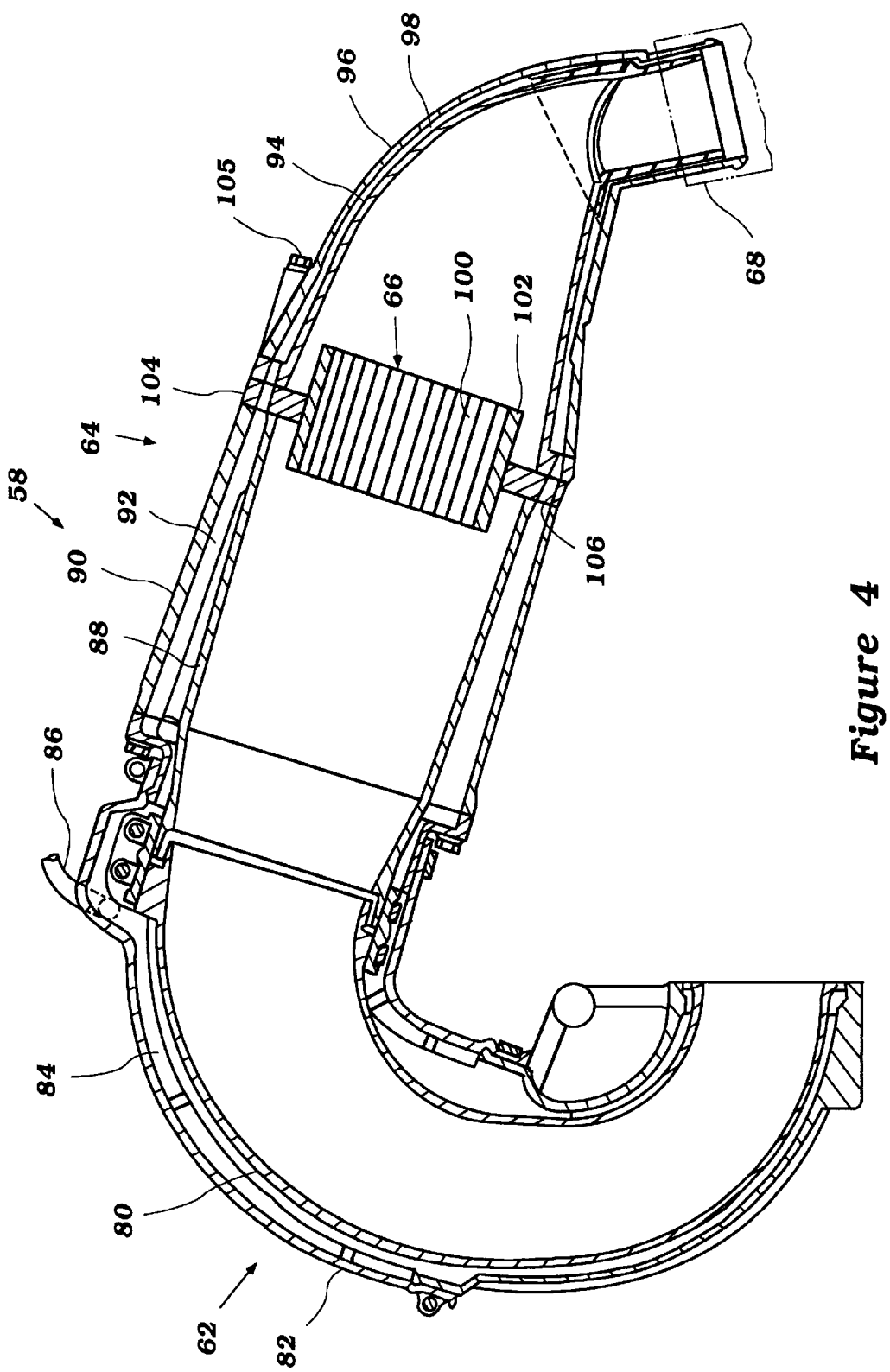
FIG. 4 is a cross-sectional view of a portion of an exhaust system for the engine illustrated in FIG. 1, the exhaust system including a catalyst.

The exhaust system 58 is illustrated in more detail in FIG. 4. As illustrated therein, the "C"-shaped pipe 62 is comprised of an inner tube 80 for routing exhaust, and an outer tube 82. The outer tube 82 is larger than, and surrounds, the inner tube 80. The outer tube 82 and inner tube 80 define therebetween a water or cooling jacket 84. Coolant is supplied to this jacket 84 for cooling the pipe 62 by a coolant supply line 86.

Similarly, the expansion pipe 64, which is connected to the "C"-shaped pipe 62. The expansion pipe 64 has an upstream portion and downstream portion, relative to the catalyst 66. In particular, the expansion pipe 64 has an upstream inner shell 88, an upstream outer shell 90, and a coolant jacket 92 therebetween. In addition, the expansion pipe 64 has a downstream inner shell 94, downstream outer shell 96, and a coolant jacket 98 therebetween and in communication with the coolant jacket 92.

The catalyst 66 preferably comprises a honeycomb catalyst flow-through structure 100 as is well known in the art, surrounded by a casing 102. The casing 102 has a flange 104 extending therefrom positioned between the upstream and downstream portions of the expansion pipe 64 for connection thereto. In particular, the flange 104 is sandwiched between the upstream and downstream portions which are held together by threaded fasteners 105. One or more passages 106 are provided through the flange 104 in that portion extending through the coolant jacket 92 for permitting the flow of coolant therethrough to the coolant jacket 98.

As also illustrated in FIG. 1, the flexible conduit 68 is connected to the outlet end of the expansion pipe 64 for routing exhaust gases therefrom to the upper exhaust pipe 70.

Figure 2:
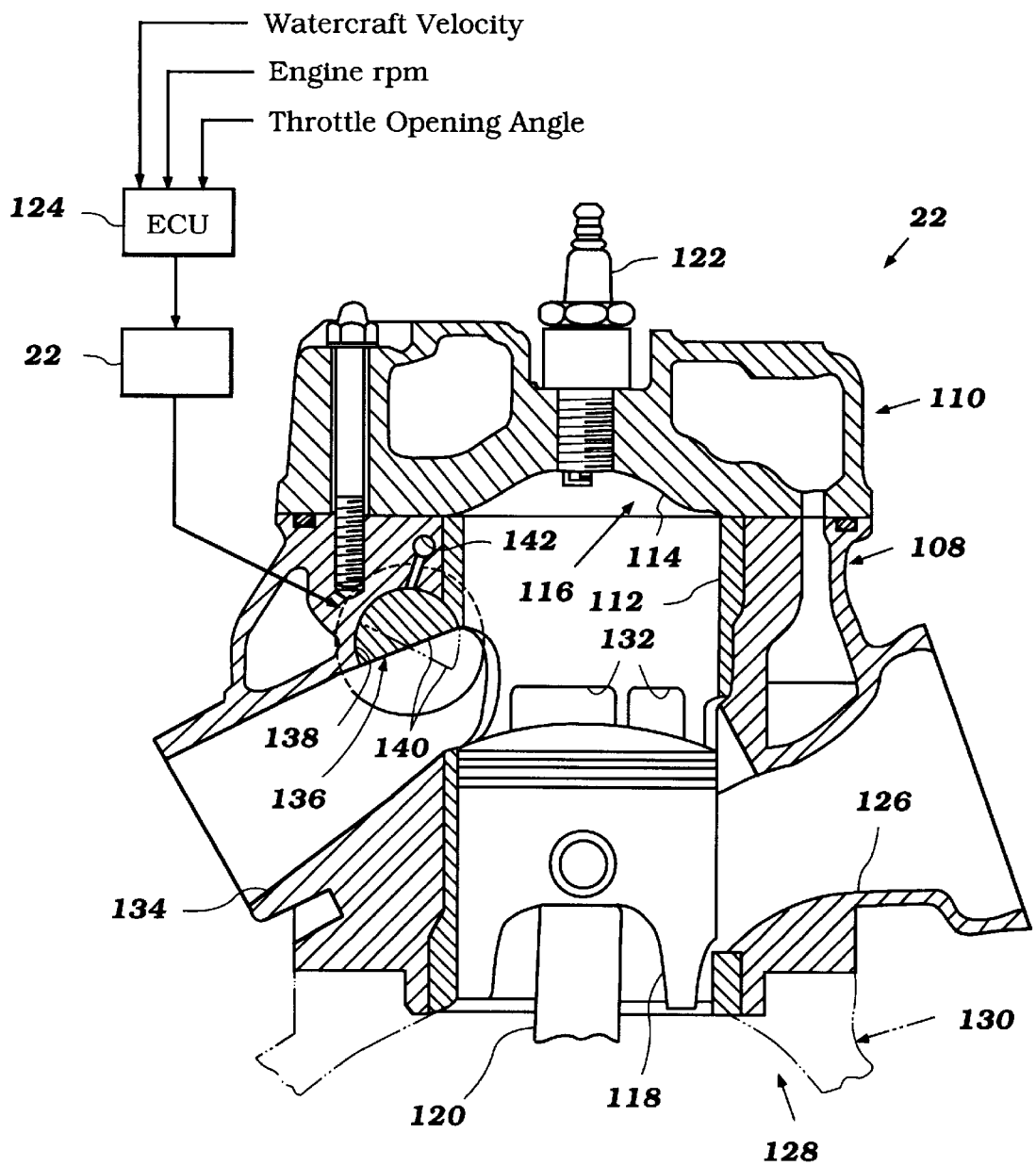
FIG. 2 is a cross-sectional view of a portion of the engine illustrated in FIG. 1.

The engine 22 is preferably of the two-cycle, internal combustion type having at least one combustion chamber. The engine 22 powering the watercraft 20 and controlled with the engine control described below, is best illustrated in FIGS. 1 and 2. As illustrated therein, the engine 22 comprises a cylinder block 108 having a cylinder head 110 connected thereto. The cylinder block 108 has at least one cylinder bore 112 therein, with the cylinder head 110 having a recessed area 114 cooperating with each bore 112 to define a combustion chamber 116. A piston 118 is movably positioned within each cylinder bore 112. The piston 118 is connected to the crankshaft 44, which is rotatably journalled to the cylinder block 108, by a connecting rod 120.

A spark plug 122 has its discharge end positioned within the combustion chamber 116 for igniting an air and fuel charge within the combustion chamber. The discharging of the spark plug 122 is preferably controlled by an electronic control unit (ECU) 124 of the engine 22 through an ignition circuit. Preferably, the ignition circuit includes a power source, such as an alternator or magneto, and a voltage increasing coil, for firing of the spark plug, as is well known in the art.

An intake passage 126 is provided through the cylinder block 108 for providing an air and fuel mixture to the combustion chamber 116. The intake passage 126 communicates with a crankcase chamber 128 formed by a crankcase portion 130 of the block 108. The combustion chamber 116 is in communication with the crankcase chamber 128 via one or more scavenge passages 132, as is well known in the art.

An exhaust passage 134 is provided through the cylinder block 108 for routing exhaust gases from the combustion chamber 116 to the exhaust manifold 60. As illustrated, a variable timing exhaust valve 136 is movably positioned within a recessed mounting 138 of the passage 134. The valve 136 is movable between two positions 140: an open position (illustrated in solid lines) in which it does not obstruct the exhaust passage 134, and a closed position (illustrated in dotted lines) in which it does obstruct the exhaust passage, where the degree to which the valve is closed determines the delay of the passage of exhaust from the combustion chamber 116.

The valve 136 may be operated by a servo motor or similar means known in the art, by way of the ECU 124. Preferably, a lubricant passage 142 provides lubricant to the area between the valve 136 and the mounting 138.

Figure 3:
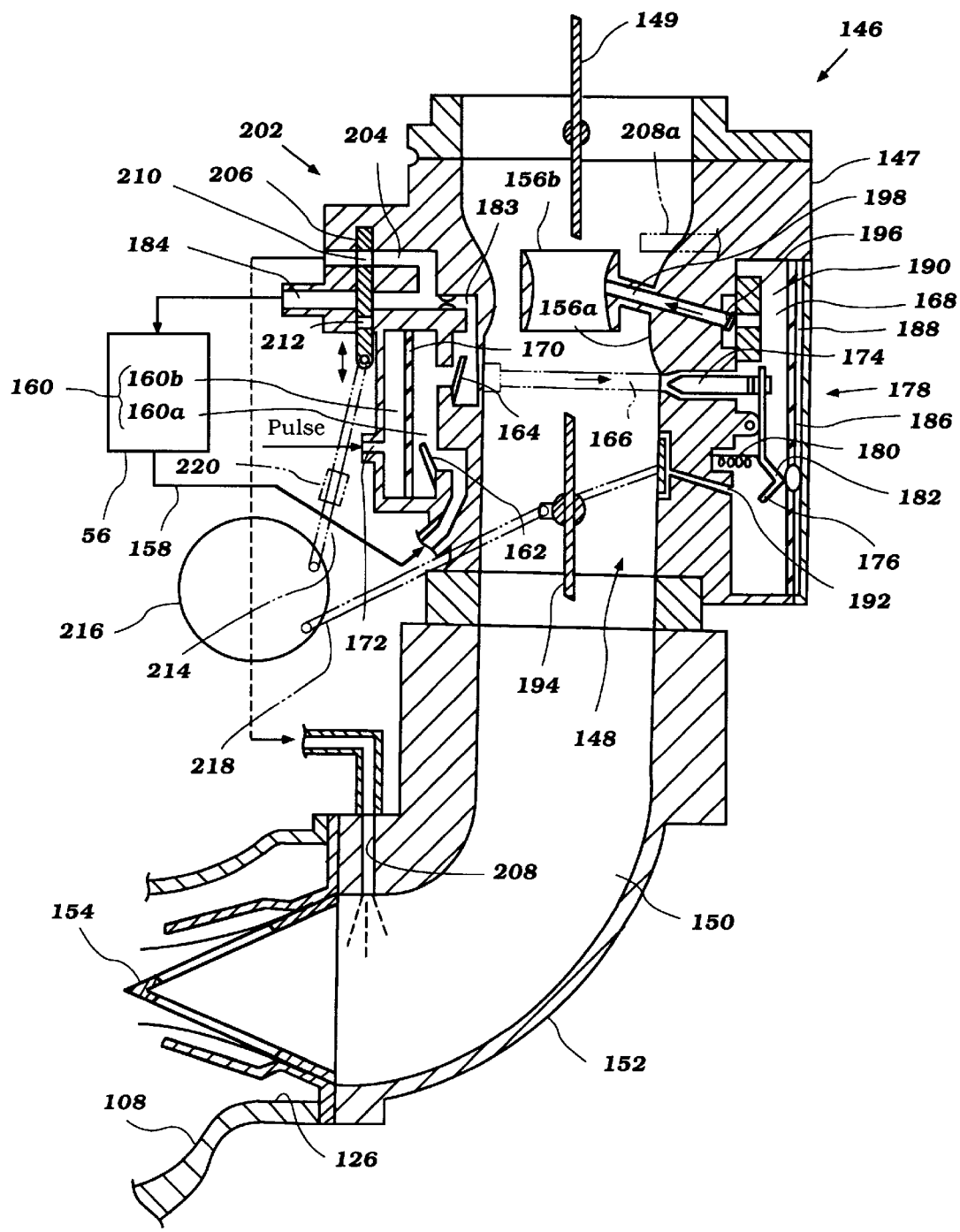
FIG. 3 is a cross-sectional view of a fuel delivery system for the engine illustrated in FIG. 1, the fuel delivery system including a fuel increasing system in accordance with the present invention.

As best illustrated in FIG. 3, a charge forming system is provided for forming an air/fuel charge for supplying to the engine 22 through the intake passage 126. Preferably, this charge forming system comprises a carburetor 146.

The carburetor 146 may have any number of a variety of configurations. FIG. 3 illustrates a specific embodiment carburetor 146 for use in the present invention, wherein the carburetor 146 includes a primary fuel delivery system and a fuel increasing system for use with the engine control of the present invention. As illustrated therein, the carburetor 146 has a body 147 having an air flow passage 148 therethrough, the first end of which is connected to an air inlet. The passage of air into the inlet is controlled by a flow control plate 149. The second end of the air flow passage 148 extends to a passage 150 through an intake manifold 152 which extends in communication with the intake passage 126. A reed valve 154 is positioned in the intake passage 126 at the junction of the intake passage 126 and manifold 152 for controlling the flow of the air and fuel mixture therethrough.

The air flow passage 148 includes a restricted area or venturi 156a through which incoming air passes. The carburetor 146 includes a first or primary fuel supply for mixing with the air passing through the air flow passage 148. The primary fuel supply is introduced within an inner venturi 156b to obtain maximum mixing of the air and fuel.

The primary source of fuel is provided by a fuel pump (not shown) from the fuel tank 56 through a fuel line 158 to the front portion 160a of chamber 160. The fuel passes through a check valve 162 when entering the front portion 160a of the chamber 160. The fuel is then metered through a second check valve 164 through a second fuel line 166 to a fuel delivery chamber 168.

An air pressure driven diaphragm 170 controls movement of the fuel in and out of the front portion 160a of the chamber 160. In particular, the diaphragm 170 is mounted to divide the chamber 160 the front and a rear portions 160a, 160b. Air moves in and out of the rear portion 160b of the chamber 160, while fuel fills front portion 160a of the chamber 160. A pulsating air source from the engine crankcase is provided through an air line 172 extending in communication with the rear portion 160b of the chamber 160. When the air pressure behind the diaphragm 170 is reduced, the fuel pressure generated by the fuel pump causes fuel to pass through the first check valve 162 and into the front portion 160a of the chamber 160. At this same time, fuel is prevented from leaving the chamber 160 by the second check valve 162, which is biased into a closed position.

When the air pressure behind the diaphragm 170 increases, the diaphragm extends inwardly. As the pressure within the front portion 160a of the chamber 160 increases, the first check valve 162 closes, preventing further inlet of fuel. At the same time, the increased pressure causes the second check valve 164 to open, allowing fuel to pass through the second fuel line 166 to the fuel delivery chamber 168.

The rate at which fuel is delivered into the fuel delivery chamber 168 is controlled, at least in part, by a needle valve 174 positioned within the line 166. This needle valve 174 is connected, via a linkage arm 176, to the throttle control 178. The arm 176 extends outwardly from the needle valve 174 some distance beyond a rotational mounting. A spring 180 biases the needle valve 174 into a closed position, i.e. one where the valve 174 substantially blocks the second fuel line 166, preventing fuel from entering the fuel delivery chamber 168.

The portion of the arm 176 extending beyond the rotational mounting includes an outwardly extending protrusion or boss 182 for abutment against an end of the throttle control 178. The throttle control 178 is configured to cause the needle valve 174 to move out of the second fuel line 166, permitting more fuel to flow therethrough. In particular, a diaphragm 186 is mounted within the fuel delivery chamber 168. The diaphragm 186 divides the chamber into an atmospheric area 188, and a fuel storage area 190. When the second check valve 164 closes, and the air pressure within the area 188 exceeds the fuel pressure, the diaphragm 186 moves inwardly, pressing the needle valve 174 open.

At nearly closed throttle positions, increasing pressure on the fuel forces the fuel through a small passage 192 into the air passage 148. When the throttle plate 194 is opened, the air pressure causes the fuel to pass through a third check valve 196 and along a fuel delivery path 198 to the inner venturi 156b, where it is delivered into the incoming air.

The fuel which is delivered into the fuel line 166 from the first chamber 160 but which is precluded from entering the fuel delivery chamber 168 by the needle valve 174 returns to the fuel tank 56 by a by-pass line 183 extending to a fuel return line 184 which extends to the fuel tank.

In accordance with the present invention, the engine 22 further includes a fuel-increasing system, whereby the amount of fuel provided to the engine is increased when required, such as during periods of acceleration. In accordance with a first embodiment of the present invention, this fuel-increasing system comprises a secondary fuel addition system, generally labeled 202.

The fuel-increasing system 202 comprises a secondary fuel delivery line 204 and valve 206 for selectively opening and closing the line 204. As illustrated, the secondary fuel delivery line 204 preferably extends from the fuel return line 184 to a line 208 extending through the intake manifold 152 to the passage 150 therethrough (as illustrated in dotted lines, the fuel may be routed to a line 208a leading into the air passage 148 extending through the carburetor body 147 near the inner venturi 156b.

The valve 206 is movably mounted in a passage which extends across the fuel return line 184 and the secondary fuel delivery line 204. The valve 206 has a first aperture 210 and a second aperture 212 extending therethrough for selective alignment with the fuel return line and secondary fuel delivery lines 184,204, respectively.

Means are provided for moving the valve 206 between a first position in which it closes the secondary fuel delivery line 204, and a second position in which the line 204 is open. In a preferred embodiment, the means preferably comprises a rotatable actuator 216 connected to the engine throttle control (positioned on the steering handle 34 for actuation by a driver of the watercraft 20).

The valve 206 is connected via a connecting rod 214 to the actuator 216. The actuator 216 is preferably a circular body rotatably connected to the throttle control, and arranged such that movement of the throttle control effectuates rotation of the actuator 216. The actuator 216 is further connected by an arm 218 to the throttle plate 194 positioned within the air flow passage 168 of the carburetor 146. In order to reduce movement of the valve 206 which might be caused by transmission of vibrations through the rod 214, a dampener 220 is preferably positioned along the rod 214.

The lengths of the rod 214 and arm 218 and the position of the apertures 210,212 in the valve 206 are selected so that the valve 206 functions as follows. In a first position, when the engine 22 is idling or slowing accelerating, the valve 206 obstructs the secondary fuel delivery line 204. At the same time, the second aperture 212 is aligned with the fuel return line 184, causing excess fuel to return to the fuel tank 56. When the actuator 216 is in this position, the throttle plate 194 is only partially open, and the primary fuel source provides the fuel necessary for the engine 22.

Upon movement of the throttle control to an acceleration position, the actuator 216 rotates to a second position. In this position, the valve 206 is moved downwardly to a position in which the first aperture 210 in the valve 204 is aligned with the secondary fuel delivery line 204. At the same time, the valve 206 obstructs the fuel return line 184. This causes excess fuel delivered into the second fuel line 166 to be routed to the secondary delivery line 204 and introduced into air and fuel mixture passing through the passage 150. At the same time, rotation of the actuator 216 causes the arm 218 to move the throttle plate 194 into an open position.

In accordance with the present invention, the engine control includes means for activating the fuel increasing mechanism and for controlling the position of the opening of the exhaust valve 136. In particular, and as best illustrated in FIG. 2, the ECU 124 is provided watercraft velocity, engine rpm and throttle angle opening data, among other data, from one or more sensors as are well known to those skilled in the art. The ECU 124 utilizes this data to control the position of the exhaust valve 136 in a manner by which the content of the exhaust flowing from the combustion chamber 116 is controlled to prevent catalyst fouling.

As illustrated in FIGS. 5(*b*) and 5(*c*), the fuel-increasing system is activated to supply additional fuel to the engine 22 to accelerate the watercraft 20, such as to its planing velocity, even before the throttle plate 194 is substantially opened. This may be accomplished by the arrangement of the actuator 216 and its connection to the plate 194 and valve 206. In particular, this arrangement causes the valve 206 to move to its second or "fuel-increasing" position well before the actuator 216 has moved a sufficient distance to substantially or fully open the throttle plate 194. In this manner, the engine control "senses" the desire acceleration of the watercraft 20 to its planing velocity even before the user fully actuates the controls. Of course, it would be possible to have the valve 206 and throttle plate 194 independently actuated as well, such as by having the ECU 124 actuate a servomotor connected to the valve 206 to control its movement.

As further illustrated in FIG. 5(*b*), the fuel increasing system is deactivated about the time the watercraft planes, or slightly thereafter (see solid line in FIG. 5(*a*) illustrating the watercraft velocity).

As best illustrated in FIG. 5(*a*), the exhaust valve 136 is preferably substantially closed when the engine is operating between 0 and 2500 rpm, is then gradually opened while the engine rpm increases between about 2500 and 5500 rpm, and is then fully open above 5500 rpm. As illustrated, this exhaust valve control strategy is linked to the velocity of the watercraft as it relates to the acceleration of the craft from idle to a planing condition.

When the driver of the watercraft 20 wishes to accelerate the craft to its planing state, the ECU 124 opens the valve gradually 136 through the engine rpm corresponding to the planing speed, with the valve being opened fully once the engine is near its maximum rpm.

The opening of the exhaust timing valve 136 in the above-stated manner has several distinct advantages. First, and as illustrated in conjunction with FIG. 5(*b*), the exhaust timing valve 136 is maintained in a closed position during the beginning of watercraft acceleration and during that time large amounts of additional fuel are being delivered to the engine 22 with the fuel increasing system. In this manner, the additional fuel is burned within the combustion chamber 116 and not exhausted to the catalyst 66, preventing fouling of the catalyst. Further, preventing blow-by of unburned fuel prevents fuel from being burned in the area of the catalyst 66, which could overheat and damage it.

Once the watercraft 20 begins to reach planing speed and the rate of secondary fuel delivery is slowed or stopped (see also FIG. 5(*b*)), the ECU 124 causes the exhaust valve 136 to begin to open. This allows the temperature of the exhaust to be lowered, thereby preventing overheating of the catalyst 66. At the same time, since the fuel delivery rate has decreased, blow-by of unburned fuel is less a concern.

It is noted that because the heating affect of the catalyst 66 which would normally be associated with the blow-by of unburned fuel is not present, the catalyst 66 may be smaller because it need not absorb as much energy without overheating. This allows the catalyst 66 to be of a lighter weight, which is significant in smaller watercraft 20 such as personal watercraft. In addition, large catalysts suffer from the fact that the coolant passing through the coolant jackets 84, 92 is much cooler in the direction of the downstream side of the catalyst 66, thus cooling the catalyst 66 more effectively on that end. At the same time, however, the blow-by affect in normal arrangements causes high heating of the not so well cooled upstream end of the catalyst. This has the effect that the catalyst his is much hotter at one end than the other, contributing to its deterioration. With the present system, since blow-by is limited, the catalyst 66 is not overheated at one end, the cooling process is more effective, the catalyst 66 has a more even temperature profile, and the durability of the catalyst is greatly improved.

Of course, the foregoing description is that of preferred embodiments of the invention, and various changes and modifications may be made without departing from the spirit and scope of the invention, as defined by the appended claims.

What is claimed is:

1. An engine control for an engine powering a watercraft, said engine having at least one combustion chamber with a member movably mounted therein, said member connected to a drive shaft for driving a water propulsion apparatus of said watercraft, a first fuel source for providing fuel to said combustion chamber, a second fuel source for providing an additional amount of fuel to said combustion chamber under certain conditions, an air source for providing air to said combustion chamber for combustion of said fuel, an exhaust passage leading from said combustion chamber, said engine control including means for detecting a condition of desired acceleration of said watercraft, means for activating said second fuel source for delivering said additional fuel in response to detecting of said condition, and means for delaying the passage of exhaust from said combustion chamber to said exhaust passage upon delivery of said additional fuel.

2. An engine in accordance with claim 1, wherein said means for detecting comprises a throttle control.

3. An engine in accordance with claim 2, wherein said means for activating comprises a valve adapted for movement in response to movement of said throttle control.

4. An engine in accordance with claim 1, wherein said means for activating comprises a valve.

5. An engine in accordance with claim 1, further including means for advancing the timing of the passage of said exhaust gas from said combustion chamber after said watercraft has planed.

6. An engine in accordance with claim 1, further including a return fuel line for returning excess fuel delivered to said first fuel source but not delivered to said combustion chamber, and wherein said second fuel source includes a fuel line in communication with said return line.

7. An engine in accordance with claim 6, wherein said means for activating comprises a valve for blocking said return line and opening said fuel line.

8. An engine in accordance with claim 1, wherein said engine includes an inlet passage leading to a crankcase chamber corresponding to said combustion chamber, a reed valve for controlling the flow of air and fuel to said crankcase chamber, and wherein said second fuel source introduces said fuel into said passage upstream of said reed valve.

9. A method for controlling the operation of an engine powering a watercraft comprising the steps of:

providing an air and fuel mixture to said engine;

detecting a condition of desired watercraft acceleration;

providing a secondary amount of fuel to the air and fuel mixture supplied to said engine upon detection of said condition; and delaying the passage of exhaust from a combustion chamber of said engine to an exhaust passage during the time said secondary fuel is delivered.

10. The method in accordance with claim 9, further including the step of stopping said step of providing said secondary amount of fuel after said watercraft has planed.

11. The method in accordance with claim 9, further including the step of gradually advancing the passage of exhaust from said combustion chamber of said engine to said exhaust passage after said watercraft has planed.

12. The method in accordance with claim 9, wherein said providing step comprises opening a second fuel line extending from a fuel return line and delivering fuel through said second fuel line to said air and fuel mixture.

13. A planing-type watercraft having a water propulsion means powered by an output of an engine, said engine having a combustion chamber with a member movably mounted therein, said member connected to a crankshaft which is journalled for rotation and which powers said output of said engine, an air source for providing air to said combustion chamber, an exhaust passage leading from said combustion chamber and valve means for controlling the timing of the passage of exhaust from said chamber to said passage, a first fuel source for providing a first amount of fuel to said air, means for providing a second amount of fuel to said air when said watercraft is accelerating to its planing speed, and means for delaying the passage of exhaust from said combustion chamber during said time said second amount of fuel is supplied.

14. The watercraft in accordance with claim 13, wherein said engine includes a throttle control for controlling the position of a throttle plate for controlling the flow of air and said first amount of fuel into said combustion chamber, said throttle movable between a first position in which a small amount of air and fuel is provided to said engine a second position in which a large amount of fuel and air is supplied to said engine, and wherein said means for providing said second amount of fuel initiates delivery of said second amount of fuel to cause acceleration of said watercraft while said throttle is substantially still in its first position.

15. The watercraft in accordance with claim 13, wherein said means for providing said second amount of fuel stops providing said fuel when said watercraft is about at its planing speed.

16. The watercraft in accordance with claim 13, wherein said means for delaying the passage of exhaust stops delaying the passage of exhaust after said watercraft has reached its planing speed.

17. An engine control for an engine powering a watercraft, said engine having at least one combustion chamber with a member movably mounted therein, said member connected to a drive shaft for driving a water propulsion apparatus of said watercraft, a first fuel source for providing fuel to said combustion chamber, a second fuel source for providing an additional amount of fuel to said combustion chamber under certain conditions, air source for providing air to said combustion chamber for combustion of said fuel, and a exhaust passage leading from said combustion chamber, said engine control including means for detecting a condition of desired acceleration of said watercraft, and means for activating said second fuel source for delivering said additional fuel in response to detecting of said condition and for causing said fuel delivery from said second fuel source to be substantially stopped before said watercraft reaches a planing speed.

18. The engine control in accordance with claim 17, further including means for delaying the passage of exhaust from said combustion chamber to said exhaust passage upon delivery of said additional fuel.

19. An engine control for an engine powering a watercraft, said engine having at least one combustion chamber with a member movably mounted therein, said member connected to a drive shaft for driving a water propulsion apparatus of said watercraft, a first fuel source for providing fuel to said combustion chamber, a second fuel source for providing an additional amount of fuel to said combustion chamber under certain conditions, an air source for providing air to said combustion chamber for combustion of said fuel, and an exhaust passage leading from said combustion chamber, said engine control including means for detecting a condition of desired acceleration of said watercraft, and means for activating said second fuel source for delivering said additional fuel in response to detecting of said condition in a manner such that a majority of the fuel delivered by said second fuel source is delivered before said watercraft reaches planing speed.

20. The engine control in accordance with claim 19, further including means for delaying the passage of exhaust from said combustion chamber to said exhaust passage upon delivery of said additional fuel.

21. A method for controlling the operation of an engine powering a watercraft, said engine having at least one variable volume combustion chamber, comprising the steps of: providing air to said at least one combustion chamber of said engine; providing fuel from a first fuel source to said at least one combustion chamber; detecting a condition of desired watercraft acceleration; providing an additional amount of fuel from a second fuel source to said at least one combustion chamber upon detection of said condition; and stopping said step of providing said secondary amount of fuel at approximately the time when said watercraft reaches planing speed.

* * * * *